United States Patent
Carden

(10) Patent No.: US 6,868,815 B2
(45) Date of Patent: Mar. 22, 2005

(54) RECIPROCATING PISTON ENGINES

(75) Inventor: Philip James Carden, Hove (GB)

(73) Assignee: Ricardo UK Limited, West Sussex (GB)

( * ) Notice: Subject to any disclaimer, the term of this patent is extended or adjusted under 35 U.S.C. 154(b) by 0 days.

(21) Appl. No.: 10/482,891

(22) PCT Filed: Jul. 5, 2002

(86) PCT No.: PCT/GB02/03088
§ 371 (c)(1),
(2), (4) Date: Aug. 4, 2004

(87) PCT Pub. No.: WO03/004845
PCT Pub. Date: Jan. 16, 2003

(65) Prior Publication Data
US 2004/0250788 A1 Dec. 16, 2004

(30) Foreign Application Priority Data
Jul. 5, 2001 (GB) .............................................. 0116450

(51) Int. Cl.⁷ ................................................ F02B 75/06
(52) U.S. Cl. ..................................... 123/192.2; 74/572
(58) Field of Search ........................... 123/192.1, 192.2; 74/572

(56) References Cited

U.S. PATENT DOCUMENTS

| | | | |
|---|---|---|---|
| 4,658,777 A | 4/1987 | Suzuki | 123/192 B |
| 5,619,956 A | 4/1997 | Koziara et al. | 123/41.31 |
| 5,751,070 A | 5/1998 | Nagao et al. | 290/46 |

FOREIGN PATENT DOCUMENTS

| | | | |
|---|---|---|---|
| GB | 1210245 | 10/1970 | F16F/15/00 |
| WO | WO 95/02758 | 1/1995 | |

OTHER PUBLICATIONS

Japanese Abstract of Publication No. 07269656 dated Oct. 20, 1995, 1 page.

*Primary Examiner*—Noah P. Kamen
(74) *Attorney, Agent, or Firm*—Osha & May L.L.P.

(57) ABSTRACT

An internal combustion engine includes one or more pistons (3) connected to a common crankshaft (4), a balancer shaft (10) connected to the crankshaft (4) to be rotated thereby at the same speed as the crankshaft (4) but in the opposite sense, the balancer shaft (10) carrying mutually offset eccentric weights (14) at its ends and an integrated starter generator unit (26) including a stator (27) and a rotor (23). The rotor (23) is mounted to rotate about the axis of the balancer shaft (10) and is connected to the balancer shaft (10) by step up gearing (18, 20, 22) such that the rotor (23) rotates in the same sense as the balancer shaft (10) but at a substantially greater speed.

4 Claims, 2 Drawing Sheets

RECIPROCATING PISTON ENGINES

CROSS-REFERENCE TO RELATED APPLICATIONS

This application claims priority to PCT Application No. PCT/GB02/03088, filed on Jul. 5, 2002, which claims priority to Great Britain Application No. 0116450.8, filed on Jul. 5, 2001.

The present invention relates to internal combustion engines of reciprocating piston type and is particularly, though not exclusively, concerned with such engines for use in relatively light, e.g. passenger-carrying, road vehicles.

Road vehicle engines are of course known with a wide range of numbers of cylinders but a significant proportion of all such engines have four cylinders. Increasing efforts are currently being made to design a cheap lightweight engine and one avenue of research relates to providing engines with only three cylinders since a reduction in the number of cylinders inherently reduces the weight and cost of the engine. However, providing an engine with an odd number of cylinders, particularly a small number, such as three, is inherently associated with increased balance and vibration problems.

The rapid reciprocating motion of the pistons necessarily imparts significant forces and moments on the engine block via the crankshaft. However, it is conventional to balance these primary out of balance forces and moments in a four cylinder in-line in engine by coupling the pistons to the crankshaft in two sets 180° out of phase with one another. The force exerted on the crankshaft by each piston moving in one direction is therefore automatically balanced by the force exerted by another piston moving in the opposite direction. However, such simple primary balance is, however, of course not possible in an engine with an odd number of cylinders.

It is known that primary force balance of a three cylinder engine may be achieved if the crank pins are angularly offset by 120° and primary moment balance may be achieved by providing a balancer shaft. Such a shaft is coupled to the crankshaft to rotate at the same speed as, but in the opposite direction to, the crankshaft. Provided at the ends of the balancer shaft are offset eccentric weights. The weights are such that the cyclical moment exerted by the balancer shaft on the engine are equal and opposite to the imbalance moment due to the odd number of pistons.

Another out of balance moment acting on an engine is the torque recoil moment. This moment is cyclical and a reaction to the output torque of the engine and is substantially synchronised with the explosions of the fuel/air mixture in the cylinders. The torque recoil moment tends to case the engine to rotate about an axis parallel to the axis of the crankshaft. It is known that the torque recoil moment may be balanced out by providing a further balancer shaft, a so-called Heron balancer shaft, details of which are disclosed in GB-A-1210245. A Heron balancer shaft is a shaft which is coupled to rotate with the crankshaft but in the opposite direction. It is of substantial mass and may carry a weight or flange in the manner of a flywheel. It may rotate at the same speed as the crankshaft but it has a greater effect if it rotates at some multiple of crankshaft speed. The torque recoil moment is not compensated for in most engines but is simply tolerated and the resultant engine motion is absorbed in the resilient engine mountings. However, the problems caused by the torque recoil moment are very much more severe in a three cylinder engine than a four cylinder engine and it is, therefore, desirable that some compensation be provided in three cylinder engines.

A further problem associated with reducing the number of cylinders of an engine from four to three is that, if the volume of each cylinder is maintained constant, the maximum power output of the engine is reduced. Under most operating conditions this is of no consequence because maximum power is rarely used. However, the maximum acceleration of the vehicle will be reduced and this can be a problem. It has been suggested that this be compensated for by making the vehicle of so-called partial hybrid type, that is to say it be provided with an electric motor which is used only occasionally, i.e. at those times when maximum acceleration is required. Whilst full hybrid vehicles have a separate large electric traction motor, partial hybrid vehicles have a combined traction motor and starter motor, a so-called Integrated Starter Generator ISG). Traditional vehicle starter motors act on toothing on the exterior of the flywheel and are very low geared to minimise the required torque capacity of the motor. This would mean that once the vehicle is running the starter motor would be rotated at an excessively high speed and this is the reason why starter motors are disengaged from the engine one it has started. Disengagement is of course inherently not possible with an ISG but the ISG has an inherently higher torque capacity since it is required to provide torque assistance during acceleration so that the lower gear ratio is not required to start the engine.

It is therefore the object of the invention to provide an engine of the type referred to above which preferably has an odd number of cylinders, particularly three cylinders, and is of partial hybrid type but in which the problems of engine balance are eliminated or at least significantly reduced.

According to the present invention, an internal combustion engine includes one or more pistons, preferably three pistons, connected to a common crankshaft, a balancer shaft connected to the crankshaft to be rotated thereby at the same speed as the crankshaft but in the opposite sense, the balancer shaft carrying mutually offset eccentric weights at its ends, and an integrated starter generator unit including a stator and a rotor, the rotor being mounted to rotate about the axis of the balancer shaft and being connected to the balancer shaft by step up gearing such that the rotor rotates in the same sense as the balancer shaft but at a substantially greater speed.

Thus the engine in accordance with the invention is of partial hybrid type, the conventional electrical starter motor and the conventional alternator, which is used to generate electricity to power electrical devices on the vehicle and to recharge the vehicle battery, being replaced by a single integrated starter generator unit which fulfils both functions. Primary moment balance of the engine is achieved by a contra-rotating balancer shaft. The integrated starter generator unit includes a stator and a rotor but does not act on the engine flywheel, as is conventional, but acts on the balancer shaft. The rotor, which is inherently of relatively substantial mass, is connected to the balancer shaft to be rotated thereby in the opposite sense to the crankshaft about an axis coaxial with the balancer shaft by means of step up gearing, which preferably has a gear ratio of between 2.5:1 and 5:1. The rotor rotates in the same sense as the balancer shaft but at a substantially greater speed and as a result of its substantial mass produces a substantial degree of torque recoil balancing. The rotor thus serves two quite different functions, that is to say as the rotatable component of an electrical machine and also as the massive rotating component of a torque recoil balance mechanism. Since the rotor rotates at e.g. three times the speed of the crankshaft, its torque recoil balancing effect is three times that which would be the case if it rotated at the same speed as the crankshaft and this provides at least partial compensation for the fact that its mass is inherently significantly less than that of the crankshaft. The step up gearing results in the integrated starter generator unit rotating significantly faster than the crankshaft and this is inherently appropriate for the generation of electricity. However, when the integrated starter generator unit is operating as a starter motor, the step up gearing operates as step down gearing and this is inherently appropriate for starter motor operation.

Whilst the step up gearing may take a number of different forms, it is preferred that it comprises an epicyclic gear set, the annulus of which is fixed, the sun wheel of which is connected to the rotor and the planet wheels and carrier of which are connected to the balancer shaft to be rotated thereby.

When installed in a vehicle, the integrated starter generator unit will of course be connected to the vehicle battery via a controller which is operated by the engine management system. When the engine is to be started, power is supplied from the battery to the integrated starter generator unit, which therefore acts as a starter motor. Once the engine is running, the power produced by the integrated starter generator unit is used to power the various electrical devices on the vehicle and excess power is used to recharge the battery. If maximum acceleration is required, the controller is controlled to supply power from the battery to the integrated starter generator unit which thus acts as a motor and supplies power to the balancer shaft and thus fo the crankshaft and thereby increases the total power output of the engine.

Further features and details of the invention will be apparent from the following description of one specific embodiment which is given by way of example with reference to the accompanying drawings, in which.

Figure 1:
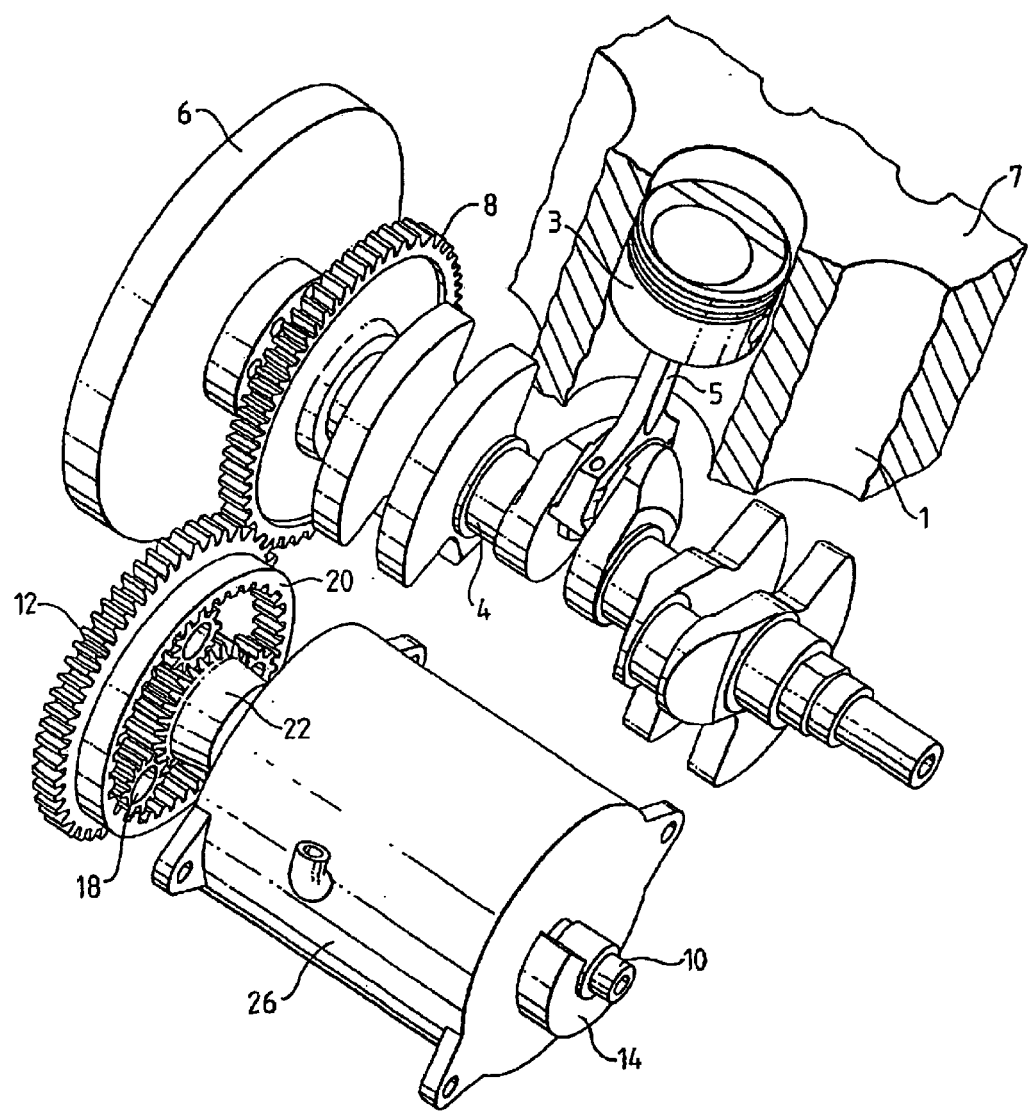
FIG. 1 is a perspective view of part of a three cylinder engine in accordance with the invention showing the crankshaft, balancer shaft and integrated starter generator unit.
Figure 2:
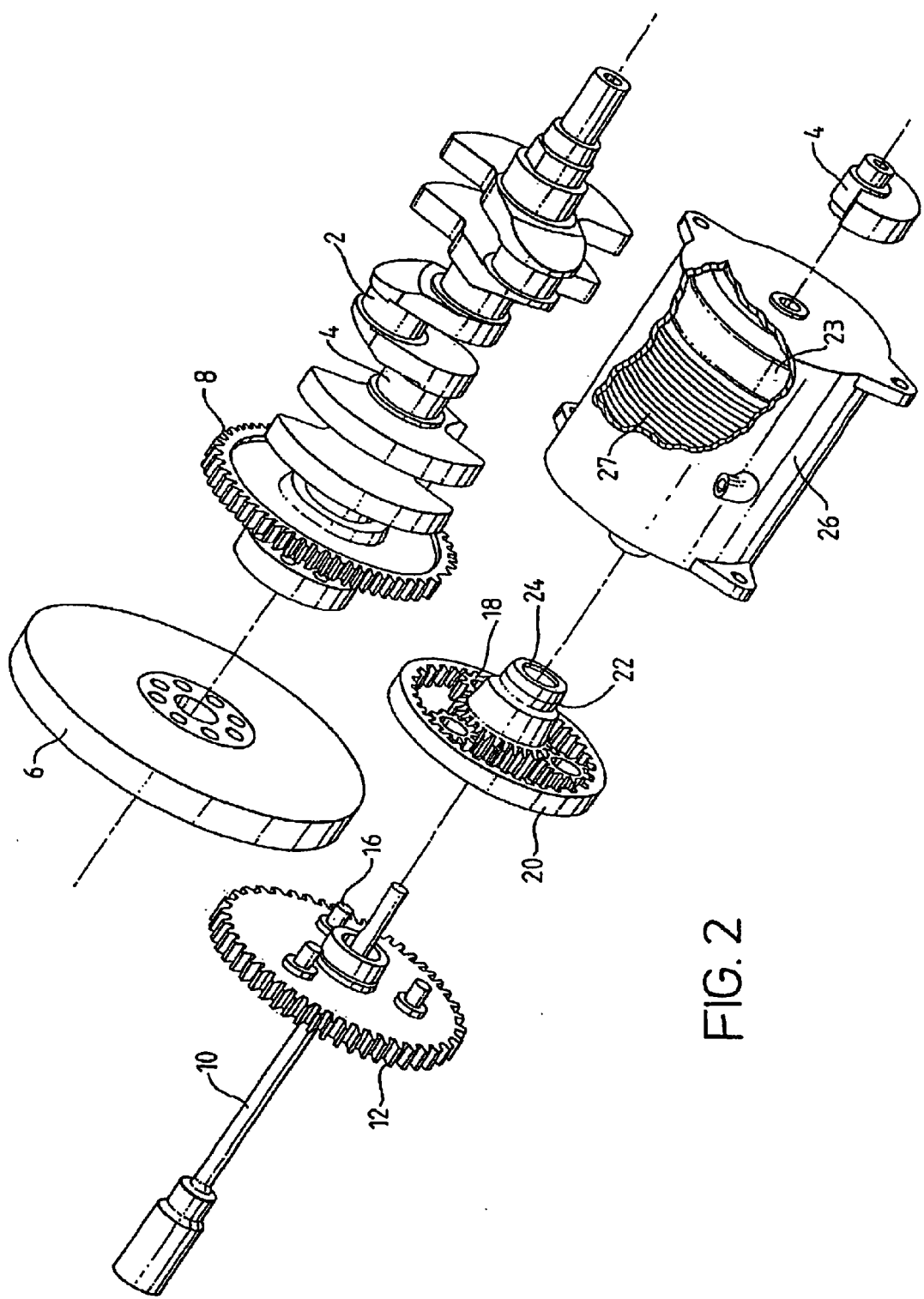
FIG. 2 is an exploded perspective view of the crankshaft, balancer shaft and integrated starter generator unit shown in FIG. 1.

The engine, of which part is shown in the drawings, includes a cylinder block 7, which is shown cut away and only in part and defines three cylinders 1 accommodating respective pistons 3, of which only one is shown and which are connected by connecting rods 5 to respective cranks 2 of a crankshaft 4. At one end, the crankshaft 4 carries a flywheel 6 of conventional type and a balancer shaft driving gear 8.

Extending parallel to the crankshaft 4 is a balancer shaft 10 which carries a driven gear 12, which is of the same size as and in mesh with the driving gear 8, whereby the balancer shaft 10 rotates at the same speed as the crankshaft 4 but in the opposite sense. Carried at the two ends of the balancer shaft 10 are eccentric weights, of which only one 14 is visible, the other being incorporated in the driven gear 12.

Projecting from one surface of the driven gear 12 and equiangularly spaced about its axis are three stub shafts 16 on which respective planet wheels 18 are rotatably mounted. The driven gear 12 thus constitutes the common carrier for the planet wheels. The planet wheels 18 are in mesh with the internal teeth on an annulus or ring gear 20 and the external teeth on a sun wheel 22. The sun wheel 22 has a central axial hole 24, through which the balancer shaft 10 passes. The shaft 10 and sun wheel 22 are not geared together and can thus rotate relative to one another. The sun wheel 22 is, however, connected to rotate with the rotor 23 of an Integrated Starter Generator unit (ISG), which is surrounded by an outer casing 26 (shown partially broken away) and includes a stator 27. The stator 27 of the ISG is connected, in use, to the battery of the vehicle powered by the engine via a controller which is connected to the engine management system.

The planetary gear set 18, 20, 22 is arranged to act as step up gearing, whereby the sun wheel 22 and thus the rotor 23 of the ISG rotates at between 2.5 and 5 times the speed of the balancer shaft 10 and in the same sense as it. The weights 14 on the balancer shaft 10 are sized and positioned such that the cyclical moment which they exert on the engine when they are rotated is equal and opposite to the primary imbalance moment applied to the engine by the three pistons, whereby the engine is in primary balance. The relatively massive rotor of the ISG rotates significantly faster than the balance shaft 10 and the crankshaft 4 and thus either balances or at least substantially reduces the torque recoil forces to which the engine is subjected.

The ISG operates in the same manner as a conventional starter motor, when the engine is to be started. When the engine is running, it operates in the same manner as a conventional alternator and provides the electrical power necessary for the various electrical devices forming part of the engine or the vehicle and excess power is used to recharge the battery. If the position of the vehicle accelerator pedal indicates that the driver wishes to have greater power than the engine is capable of producing in the long term, the engine management system switches the controller so that the vehicle battery powers the ISG to operate as a motor. Its mechanical output is supplied to the crankshaft via the balancer shaft and the gears 12 and 8, thereby temporarily increasing the total power output of the engine for a brief period of time.

If desired, a further epicyclic gear set can be provided in series with the epicyclic gear set described above so as to provide a step up gear ratio between the balancer shaft and the rotor of, say, 15. This may be a more appropriate gear ratio for the ISG, when operating in starter mode and the ISG may be designed so that the substantial speed at which it is rotated, in use, is appropriate also when operating in generator mode.

As will be apparent, the present invention is particularly applicable to engines with an odd number of cylinders, particularly three cylinders, but it is found that it is also of value with certain engines with an even number of cylinders. Thus the invention is applicable to all in-line engines with five or less cylinders and to certain engines with 12 cylinders or less arranged in a V configuration.

What is claimed is:

1. An internal combustion engine including one or more pistons (3) connected to a common crankshaft (4), a balancer shaft (10) connected to the crankshaft (4) to be rotated thereby at the same speed as the crankshaft (4) but in the opposite sense, the balancer shaft (10) carrying mutually offset eccentric weights (14) at its ends, characterised in that an integrated starter generator unit (26) is provided including a stator (27) and a rotor (23) and that the rotor is mounted to rotate about the axis of the balancer shaft (10) and is connected to the balancer shaft (10) by step up gearing (18, 20, 22) such that the rotor (23) rotates in the same sense as the balancer shaft (10) but at a substantially greater speed.

2. An engine as claimed in claim 1 in which the step up gearing comprises an epicyclic gear set, the annulus (20) of which is fixed, the sun wheel (22) of which is connected the rotor (23) and the planet wheels (18) and carrier (12) of which are connected to the balancer shaft (10) to be rotated thereby.

3. An engine as claimed in claim 1 in which the step up gearing (18, 20, 22) has a gear ratio of between 2.5:1 and 5:1.

4. An engine as claimed in claim 2 in which the step up gearing (18, 20, 22) has a gear ratio of between 2.5:1 and 5:1.

* * * * *